United States Patent Office 3,541,886
Patented Nov. 24, 1970

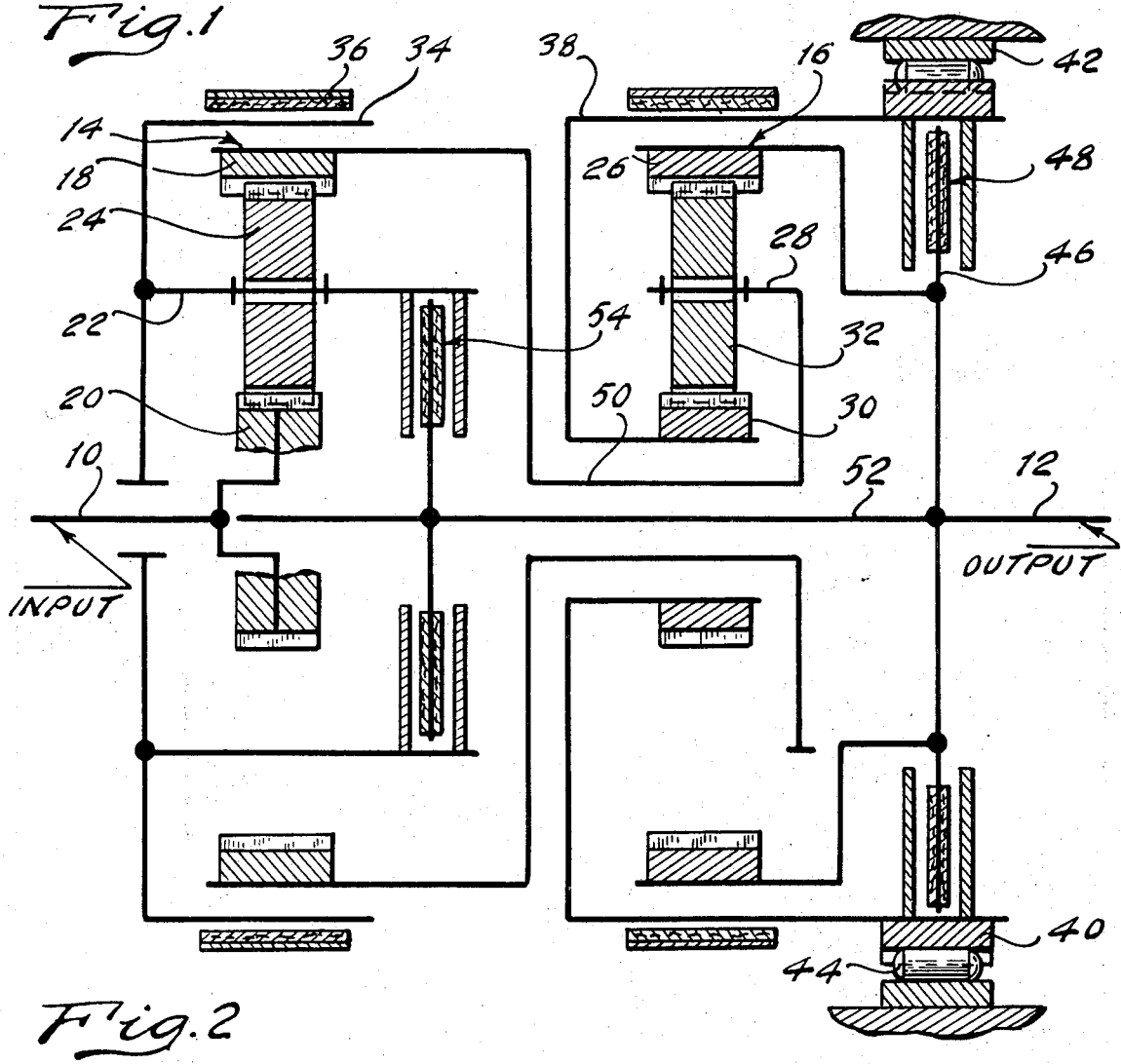

3,541,886
TWO-SPEED TRANSMISSION WITH TWO SIMPLE PLANETARY GEAR UNITS
Charles C. Bookout, Orchard Lake, Mich., assignor to Ford Motor Company, Dearborn, Mich., a corporation of Delaware
Filed Apr. 14, 1969, Ser. No. 816,003
Int. Cl. F16h *57/10*
U.S. Cl. 74—763          6 Claims

ABSTRACT OF THE DISCLOSURE

A two-speed ratio transmission mechanism including two simple planetary gear units that are commercially available in three-speed ratio automotive transmission mechanisms, the gear units establishing a compound torque delivery path during operation in underdrive, and a direct-drive, lock-up condition being established during high speed ratio operation, the ratio spread between the underdrive and the direct-drive ratios being compatible with the operating requirements of a two-speed ratio driveline.

GENERAL DESCRIPTION OF THE INVENTION

My invention is adapted to be used in the driveline of automotive vehicles. It includes elements that are common to contemporary automotive vehicle power transmission mechanisms such as that disclosed in Leonard et al. Pat. No. 3,295,387, which is assigned to the assignee of my invention.

I have arranged the gear elements of the two simple planetary gear units so that they cooperate with each other to produce a compound torque delivery path during low speed ratio operation, and which are effective to establish a direct drive ratio for cruising operation. The ratio change does not result in high inertia forces, which would be the case if the speed ratio differential were to be equal to the low speed ratio normally available in a three-speed ratio conventional transmission employing the same gear elements. On the other hand, the ratio difference for each of the two-speed ratios is sufficiently high to permit adequate vehicle acceleration throughout a relatively wide vehicle performance range.

Because of the simplicity of the gearing arrangement, it is possible to employ a simple, semi-automatic valve system for controlling the engagement and disengagement of the clutches and brakes which form a part of the transmission structure.

The same gear elements used for establishing each of the two forward driving speed ratios are capable of establishing a single reverse drive speed ratio by substituting one reaction point for another. This is accomplished by employing a friction brake for anchoring the reverse drive reaction element of the gearing as the other reaction element forms a part of the torque delivery path.

BRIEF DESCRIPTION OF THE FIGURES OF THE DRAWINGS

FIG. 1 shows in schematic form the gearing arrangement and the clutch and brake arrangement for a transmission structure embodying the improvements of my invention.

FIG. 2 shows a chart that indicates the torque ratios that are available in a preferred embodiment of my invention.

PARTICULAR DESCRIPTION OF THE INVENTION

Numeral 10 in FIG. 1 indicates a power input shaft, which may be connected to the turbine shaft of a hydrokinetic torque converter, not shown. The torque converter in the transmission gearing structure that I will describe in this specification forms a torque delivery path in an automotive vehicle driveline. Numeral 12 indicates a power output shaft or driven shaft which may be connected through a suitable drive shaft and through a differential and axle assembly to the vehicle traction wheels.

Two simple planetary gear units are indicated at 14 and 16, the gear elements for each of the gear units are of the same pitch diameter, and may be interchangeable. Gear element 14 includes a ring gear 18, a sun gear 20 and a carrier 22. Planetary pinions 24 are journaled rotatably on the carrier 22 in meshing engagement with the ring gear 18 and the sun gear 20. Gear unit 16 has corresponding elements, which include a ring gear 26, a carrier 28, a sun gear 30 and planetary pinions 32. The carrier 28 journals rotatably with pinions 32 as the latter mesh with ring gear 26 and the sun gear 30.

Carrier 22 is connected directly to a brake drum 34, which is surrounded by a reverse brake band 36. This band can be applied and released by a fluid pressure operated brake servo.

Sun gear 30 is connected to a brake drum 38. The inner race 40 of an overrunning brake is connected directly to the brake drum 38. The overrunning brake includes a stationary outer race 42, which may be cammed to provide cam surfaces that register with overrunning brake elements 44.

The ring gear 26 and the shaft 12 are connected to clutch disc 46. This forms a part of a high speed ratio clutch 48, which connects drivably the brake drum 38 with power output shaft 12 and with the ring gear 26 to effectively lock together the elements of the gear unit 16 for rotation in unison.

Carrier 28 is connected to sleeve shaft 50, which in turn is connected to ring gear 18 of the planetary gear unit 14. Carrier 22 of gear unit 14 is connected to intermediate shaft 52 through a selectively engageable, forward-drive, friction clutch 54. Intermediate shaft 52 in turn is connected to the output shaft 12.

To establish the lowest, forward-driving speed ratio, the forward drive clutch 54 is engaged. The overrunning brake shown in part at 44 provides a torque reaction. The addition brake band, surrounding brake drum 38, complements the braking function of the overrunning brake, but it is not required except during coast braking or hill braking. Under these conditions torque is delivered to the sun gear 20, thereby imparting a forward driving torque to the carrier 22.

This forward driving torque is delivered to the shaft 12 through the clutch 54. A reverse torque is imparted to the ring gear 18, which is transferred to the carrier 28. Front gear 30 acts as a reaction point since it is anchored by the overrunning brake. This reverse torque opposes the driving torque of the carrier 22 thereby producing an output torque and speed that is the resultant of the compound action of the gear elements as two torque delivery paths through the gear elements are established.

A locked-up, direct-drive condition is achieved when the clutch 48 is applied while clutch 54 remains applied. The overrunning brake now will free wheel, and the shaft 12 will be driven by the shaft 10 with a 1 to 1 speed ratio.

Reverse drive is accomplished by engaging the brake 36 and releasing the clutch 54. Sun gear 20 acts as a power input element, but the ring gear 18 now is driven in a reverse direction since the carrier 22 acts as a reaction point. This reverse rotation is imparted to the carrier 28. Again the sun gear 30 is held from rotating by the overrunning brake, and the ring gear 26 is driven, thereby causing the shaft 12 to be driven in a reverse direction. But since the multiplication ratio of the unit 14 with the sun gear 20 acting as an input member is greater than the multiplication gear ratio of gear unit 16 with carrier 28 acting as an input member, the resultant ratio available is the product of the two ratios, and that product is less than the gear ratio of gear unit 14 acting alone.

In FIG. 2 are shown typical values for the torque ratios when the ratio of the pitch diameters of the sun gear and the ring gears for each of the units 14 and 16 is equal to .46.

Having thus described a preferred embodiment of my invention, what I claim and desire to secure by U.S. Letters Patent is:

1. A planetary gear transmission mechanism for use in an automotive vehicle driveline comprising a power input member, a power output member, two simple planetary gear units, each gear unit comprising a ring gear, a carrier, a sun gear and planetary pinions journaled in said carrier in meshing engagement with said sun and ring gears, the sun gear of a first gear unit being connected to said input member, brake means for anchoring the carrier of said first gear unit during reverse drive operation, forward drive clutch means for connecting the carrier of the first gear unit to said output member, the ring gear of said first gear unit being connected to the carrier of the second of said gear units, other brake means for anchoring the sun gear of said second gear unit, the ring gear of said second gear unit being connected to said output member, clutch means for connecting together two gears of said second gear unit during high speed ratio operation.

2. The combination as set forth in claim 1 wherein the gears of each gear unit are formed with a pitch diameter equal to the counterpart gears of the other gear unit.

3. The combination as set forth in claim 1 wherein said last name clutch means includes elements connected to the sun gear of said second gear unit and the ring gear unit of said second gear unit whereby said last name sun and ring gears are connected together when said second clutch means is applied.

4. The combination as set forth in claim 2 wherein said last name clutch means includes elements connected to the sun gear of said second gear unit and the ring gear unit of said second gear unit whereby said last name second ring gears are connected together when said second clutch means is applied.

5. The combination as set forth in claim 3 wherein said other brake means for said second gear unit includes a brake drum connected to the sun gear of said second gear unit, brake means for anchoring said brake drum against rotation in one direction but permitting free-wheeling rotation in the appropriate direction, and friction brake means for anchoring said drum to complement the action of said overrunning brake means thereby providing a torque reaction point during coasting and hill braking operation.

6. The combination as set forth in claim 4 wherein said other brake means for said second gear unit includes a brake drum connected to the sun gear of said second gear unit, brake means for anchoring said brake drum against rotation in one direction but permitting free-wheeling rotation in the appropriate direction, and friction brake means for anchoring said drum to complement the action of said overrunning brake means thereby providing a torque reaction point during coasting and hill braking operation.

References Cited
UNITED STATES PATENTS

| | | | |
|---|---|---|---|
| 2,531,996 | 11/1950 | Voytech | 74—759 X |
| 2,786,369 | 3/1957 | Simpson | 74—759 |
| 2,914,967 | 12/1959 | Simpson | 74—763 X |
| 3,292,458 | 12/1966 | Livezey | 74—763 |

MARK M. NEWMAN, Primary Examiner

T. C. PERRY, Assistant Examiner